US007149005B2

(12) United States Patent
Chung

(10) Patent No.: US 7,149,005 B2
(45) Date of Patent: Dec. 12, 2006

(54) DEPTH OF FIELD CONTROL DEVICE

(75) Inventor: Ming-Chieh Chung, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 884 days.

(21) Appl. No.: 10/212,177

(22) Filed: Aug. 6, 2002

(65) Prior Publication Data

US 2004/0028425 A1 Feb. 12, 2004

(51) Int. Cl.
*H04N 1/04* (2006.01)

(52) U.S. Cl. ...................... 358/474; 358/498; 358/496; 399/177; 399/367; 271/186

(58) Field of Classification Search ................ 358/474, 358/498, 496, 497; 399/177, 367; 271/186
See application file for complete search history.

(56) References Cited

U.S. PATENT DOCUMENTS 5,430,536 A * 7/1995 Fullerton et al. ........... 399/364
5,513,017 A * 4/1996 Knodt et al. ................ 358/471
5,734,483 A * 3/1998 Itoh ........................... 358/496
6,392,763 B1 * 5/2002 Nishinohara et al. ....... 358/496
6,819,456 B1 * 11/2004 Chen .......................... 358/474
6,859,636 B1 * 2/2005 Mitomi ...................... 399/367

* cited by examiner

*Primary Examiner*—Douglas Q. Tran
*Assistant Examiner*—Negussie Worku
(74) *Attorney, Agent, or Firm*—Rosenberg, Klein & Lee

(57) ABSTRACT

A depth of field control device is provided. The depth of field control device is installed on an automatic document feeder having a scan glass surface. The depth of field control device comprises a plate member having at least one protrusion on its front side and a hook structure at its backside, wherein the hook structure at the backside of the plate member hooks the automatic document feeder and the protrusion is in contact with the scan glass surface; a reflection sheet attached to the plate member and fixed on the automatic document feeder; and a flexible device biasing the plate member at the backside of the plate member.

6 Claims, 4 Drawing Sheets

DEPTH OF FIELD CONTROL DEVICE

BACKGROUND OF THE INVENTION

1. Field of the Invention

The present invention relates to a depth of field (DOF) control device and in particular, a depth of field (DOF) control device installed on an automatic document feeder (ADF) to achieve a better DOF control.

2. Description of the Prior Art

Referring to FIG. 1 and FIG. 2, office copy machines such as a printer or an image scanner having an automatic document feeder (ADF) are known in the art. Generally, a depth of field or depth of focus (DOF) controller is provided in the automatic document feeder for precisely control the object to be scanned, which is placed across a transparent glass of a scanner or a printer, within an acceptable range of DOF during the scan in order to obtain a clear image on a copy sheet.

FIG. 1 and FIG. 2 illustrate a typical DOF control (0.1~0.2 mm). A plate member (metal plate) 10*a* is used. The plate member (metal plate) 10*a* has a rotation center 11*a*. Through the rotation center 11*a*, the plate member (metal plate) 10*a* is pivotally installed on the automatic document feeder 12*a*.

However, the prior art DOF control device is not perfect. When the automatic document feeder 12*a* and the underlying glass surface 13*a* cannot provide an even surface, one end of the object to be scanned will attach the glass while the other end will float in the air, causing a sever DOF control problem.

Accordingly, there is a strong need for an improved DOF control device which has good reliability.

SUMMARY OF THE INVENTION

The main objective of the invention is to provide an improved to depth of field (DOF) control device solve the above-mentioned problem. The DOF control device of this invention comprises a reflection sheet that is attached to a plate member and combined with an automatic document feeder. The plate member is bias by flexible devices. A hook structure is provided at backside of the plate member to hook the automatic document feeder. Protrusions are provided on front side or contact side of the plate member to a glass surface. By capitalizing on the protrusions 11 and the gaps between the protrusion and the plate member, the depth of field during the scan is well controlled. In the case that the automatic document feeder and the glass surface cannot provide even surface, in contrast to the prior art, since the plate member has no rotation center, the plate member is forced by the flexible devices and tightly attached to the glass surface.

In accordance with the present invention, a depth of field control device is provided. The depth of field control device is installed on an automatic document feeder having a scan glass surface. The depth of field control device comprises a plate member having at least one protrusion on its front side and a hook structure at its backside, wherein the hook structure at the backside of the plate member hooks the automatic document feeder and the protrusion is in contact with the scan glass surface; a reflection sheet attached to the plate member and fixed on the automatic document feeder; and a flexible device biasing the plate member at the backside of the plate member.

Other objects, advantages and novel features of the invention will become more clearly and readily apparent from the following detailed description when taken in conjunction with the accompanying drawings.

DETAILED DESCRIPTION OF THE PREFERRED EMBODIMENT

Figure 1:
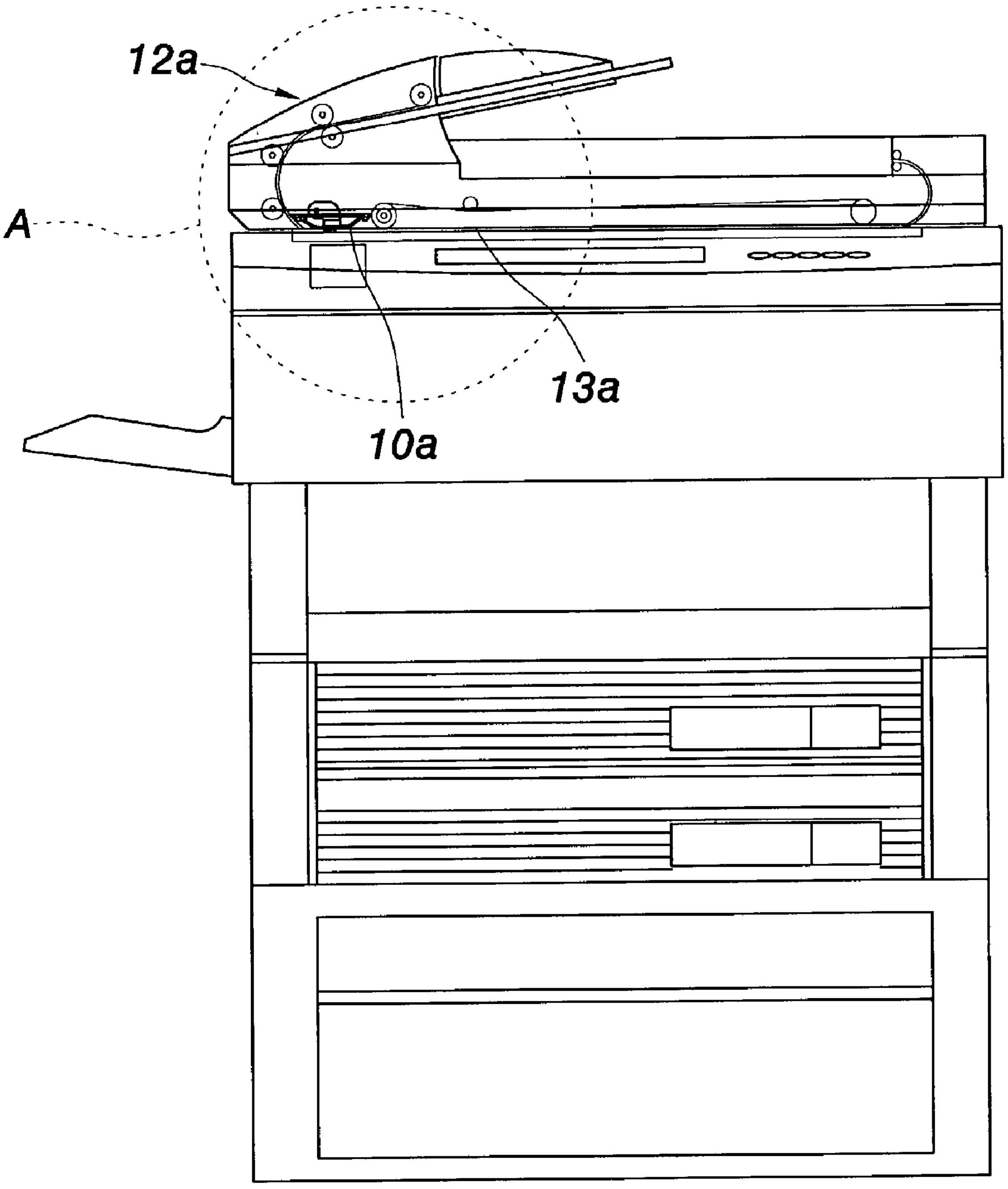
FIG. 1 PRIOR ART
FIG. 1 is a typical view of a prior art ADF.
Figure 2:
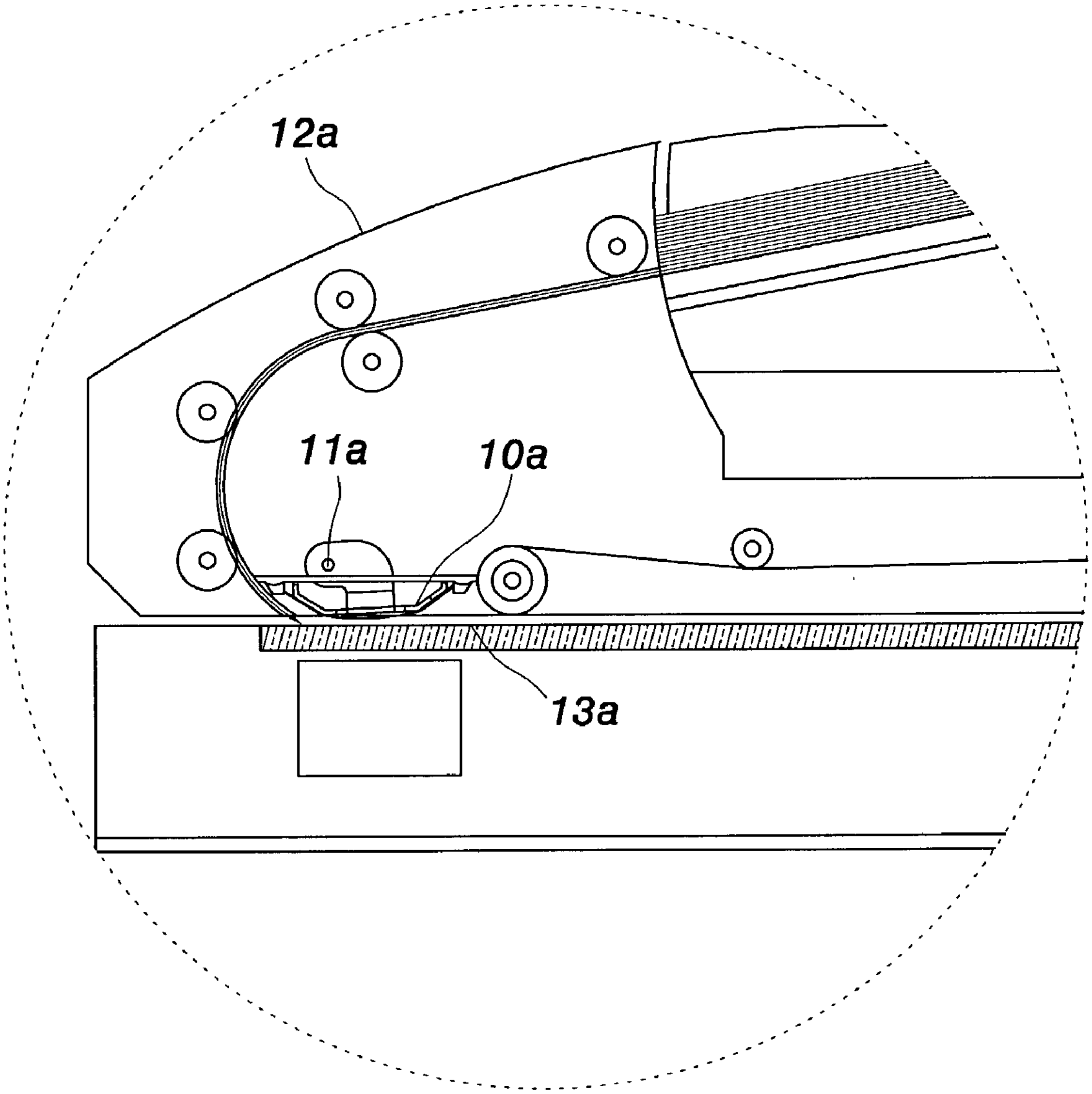
FIG. 2 PRIOR ART
FIG. 2 is an enlarged, cross-sectional view showing section A of FIG. 1.
Figure 3:
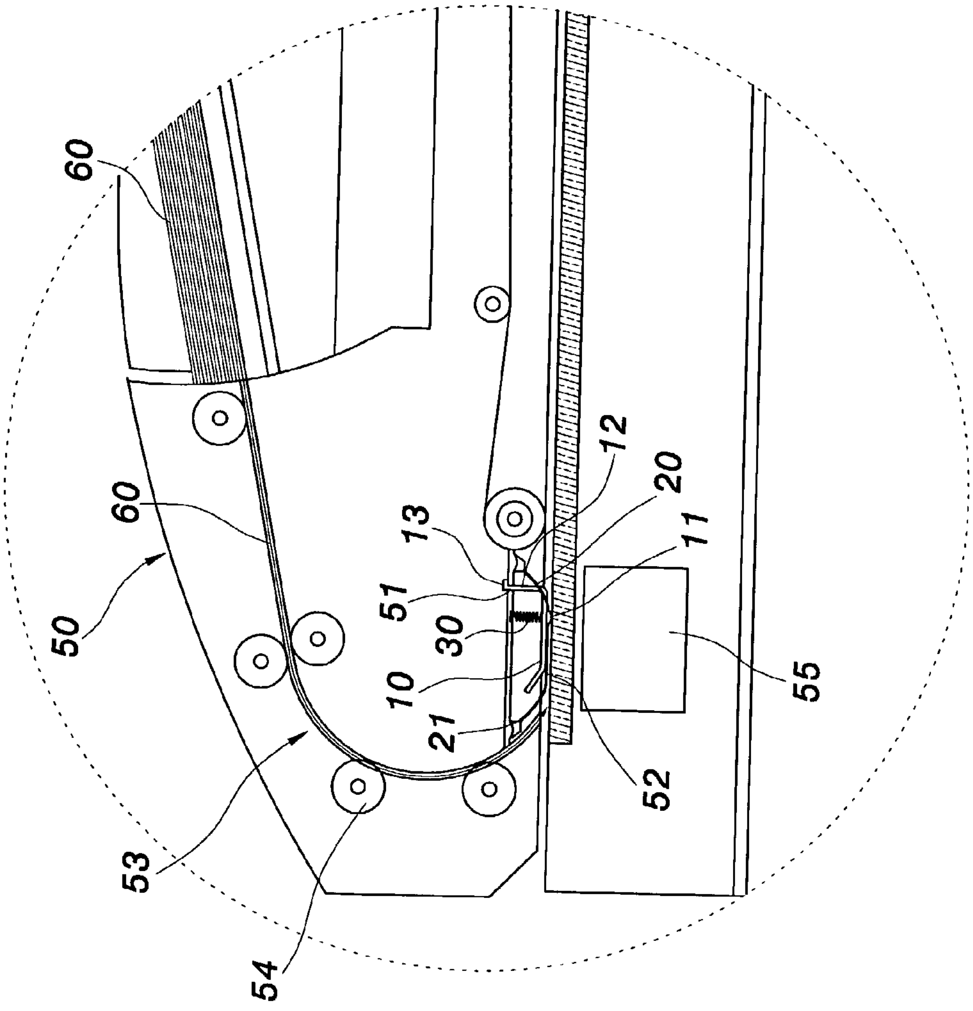
FIG. 3 is a cross-sectional view of this invention.
Figure 4:
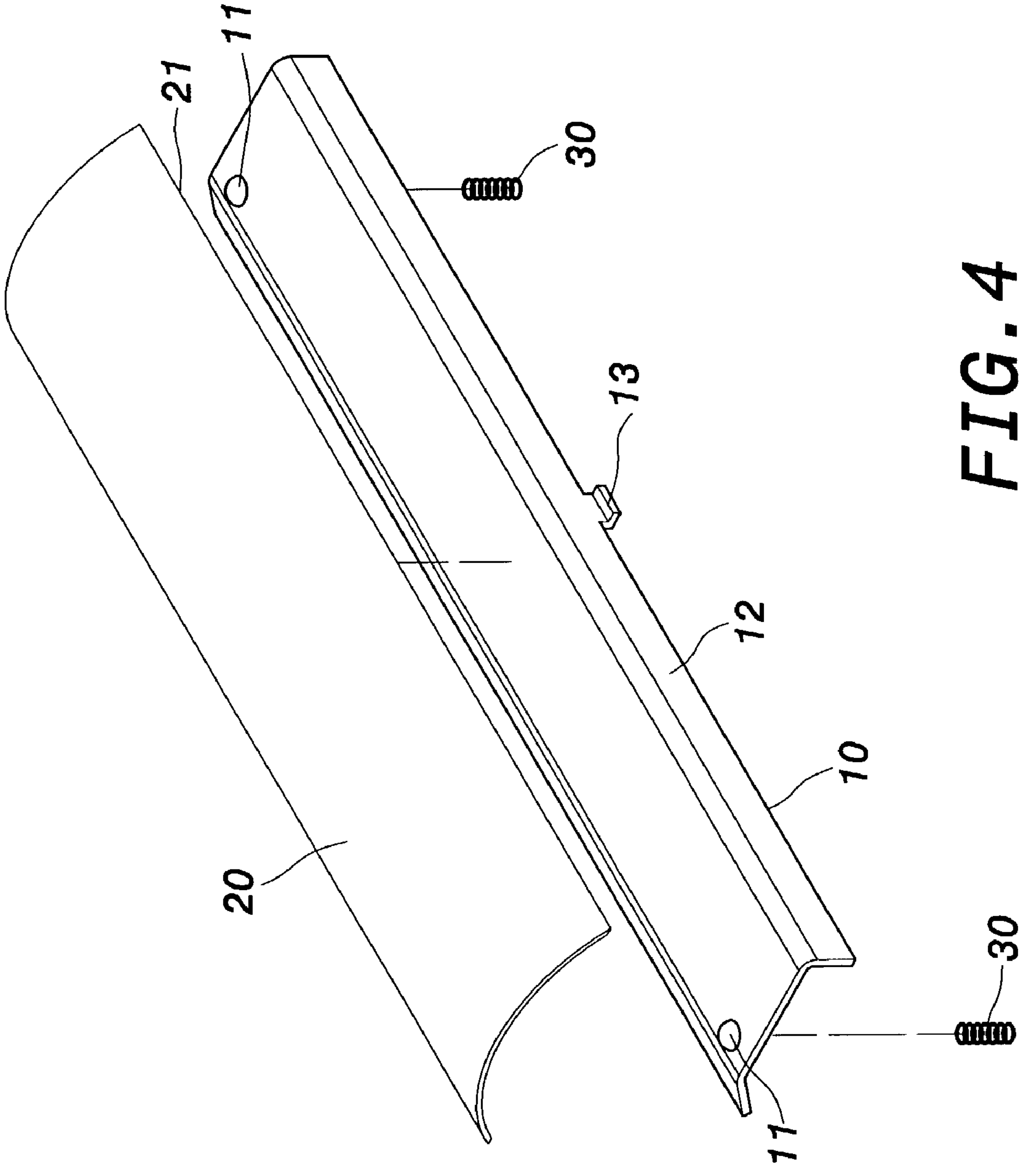
FIG. 4 is an exploded diagram of this invention.

Please refer to FIG. 3 and FIG. 4. The present invention is directed to an improved depth of field (DOF) control device, especially suited for an automatic document feeder (ADF) 50 to achieve a better DOF control. The depth of field control device comprises a plate member 10, a reflection sheet 20, and a plurality of flexible devices 30. The plate member 10 is made of metal such as steel, or made of plastic materials. Preferably, the plate member 10 is a strip of metal having a plurality of protrusions 11 distributed on its upper surface. The amount of the protrusions 11 can be changed according to the need. According to the preferred embodiment of the present invention, there are two protrusions 11 provided. The protrusions 11 are arranged near the edge of the plate 10.

The plate member 10 has a bent side to form a flange 12, which extends downwardly from the bottom surface of the plate member 10. A least one L-shaped hook structure 13 is provided along the peripheral edge of the flange 12. As illustrated, the hook structure 13 is formed at the backside of the plate member 10. An opening 51 corresponding to the hook structure 13 is provided on the automatic document feeder 50. The hook structure 13 at the backside of the plate member 10 engages with the opening 51 to combine the plate member 10 with the automatic document feeder 50 and make the protrusions 11 on a front side of the plate member 10 face the underlying glass surface 52.

The reflection sheet 20 is composed of white color plastic materials and has good light reflection performance. The reflection sheet 20 is attached to the plate member 10. The reflection sheet 20 has a front end 21 secured to the automatic document feeder 50, such that the reflection sheet 20 fixed on the automatic document feeder 50 with either one end or two ends.

The flexible devices 30 are springs located on the backside of the plate member 10. The flexible devices 30 correspond to the protrusions 11. One end of each of the flexible devices 30 abuts upon the automatic document feeder 50, while the other end of each of the flexible devices 30 abuts upon the backside of the plate member 10. That is, the flexible devices 30 are arranged between the automatic document feeder 50 and the plate member 10.

As shown in FIG. 3, the DOF control device of this invention is installed on the automatic document feeder 50, which comprises a paper delivery mechanism 53 comprising a plurality of rollers 54 for delivering object to be scanned 60. The plurality of rollers 54 drive the object to be scanned 60 such as a sheet of document to enter the scan area. An image obtain module 55 is disposed under the scan area. The image obtain module 55 is a contact image sensor (CIS) or a charge coupled device (CCD) for reading the image of the object to be scanned 60. The object to be scanned 60 passes through between the reflection sheet 20 and the glass surface 52 to restrain DOF during the scan.

To sum up, the DOF control device of this invention comprises a reflection sheet 20 that is attached to the plate member 10 and combined with the automatic document feeder 50. The plate member 10 is bias by the flexible devices 30. The hook structure 13 is provided at the backside of the plate member 10 to hook the automatic document feeder 50. The protrusions 11 are provided on the front side or contact side of the plate member 10 to the glass surface 52. By capitalizing on the protrusions 11 and the gaps between the protrusion and the plate member 10, the depth of field during the scan is well controlled. In the case that the automatic document feeder 50 and the glass surface 52 cannot provide even surface, in contrast to the prior art, since the plate member 10 has no rotation center, the plate member 10 is forced by the flexible devices 30 and tightly attached to the glass surface 52.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A depth of field control device installed on an automatic document feeder having a scan glass surface, the depth of field control device comprising:

a plate member having at least one protrusion on its front side, a hook structure at its backside, and a bent side to form a flange the flange is extending downwardly from bottom surface of the plate member toward the direction against the protrusion, wherein the hook structure at the backside of the plate member is provided along the peripheral edge of the flange and hooks the automatic document feeder and the protrusion is in contact with the scan glass surface;

a reflection sheet attached to the plate member and fixed on the automatic document feeder; and a flexible device biasing the plate member at the backside of the plate member.

2. The depth of field control device as claimed in claim 1 wherein the plate member is made of metal.

3. The depth of field control device as claimed in claim 1 wherein, the flange is extending downwardly from bottom surface of the plate member toward the direction against the protrusion.

4. The depth of field control device as claimed in claim 1 comprising a plurality of hook structures.

5. The depth of field control device as claimed in claim 1 wherein the automatic document feeder comprises an opening corresponding to the hook structure, and the opening engages with the hook structure.

6. The depth of field control device as claimed in claim 1 wherein the reflection sheet is fixed on the automatic document feeder with one end or two ends.

* * * * *